United States Patent [19]

Matsumoto et al.

[11] 4,257,374
[45] Mar. 24, 1981

[54] METHOD OF CONTROLLING INTERNAL COMBUSTION

[75] Inventors: Hiromitsu Matsumoto, Hamamatsu; Minoru Yamada, Iwata, both of Japan

[73] Assignee: Yamaha Hatsukoki Kabushiki Kaisha, Iwata, Japan

[21] Appl. No.: 965,484

[22] Filed: Dec. 1, 1978

[30] Foreign Application Priority Data

Mar. 10, 1978 [JP] Japan .................................. 53-27967

[51] Int. Cl.³ .......................... F02B 17/00; F02B 3/00
[52] U.S. Cl. .................................... 123/432; 123/337
[58] Field of Search ................. 261/23 A, 41 D, 65 R; 123/127, 32 SP, 75 B, 103 R, 122 AB, 122 AC, 432, 308, 337

[56] References Cited

U.S. PATENT DOCUMENTS

| | | | |
|---|---|---|---|
| 2,028,585 | 1/1936 | Blake | 123/119 R |
| 2,609,806 | 9/1952 | Winkler | 261/41 C |
| 2,647,502 | 8/1953 | Braun | 261/23 A |
| 2,798,703 | 7/1957 | Carlson | 261/41 C |
| 2,837,322 | 6/1958 | Thome | 261/41 C |
| 3,543,736 | 12/1970 | Suzuki | 123/119 R |
| 4,095,565 | 6/1978 | Noguchi | 123/32 SP |

FOREIGN PATENT DOCUMENTS 729422  5/1955  United Kingdom .................. 261/23 A Primary Examiner—Ronald H. Lazarus
Attorney, Agent, or Firm—Ernest A. Beutler

[57] ABSTRACT

An induction system for an internal combustion engine having a relatively large main intake passage that supplies the cylinders under medium and high load conditions and a relatively small auxiliary induction passage that feeds the cylinders under idle and low load conditions. The flow through the induction passages is controlled by a main and an auxiliary throttle valve which are interconnected by a linkage system that improves induction efficiency throughout the engine speed and load ranges.

14 Claims, 7 Drawing Figures

FIG. 4
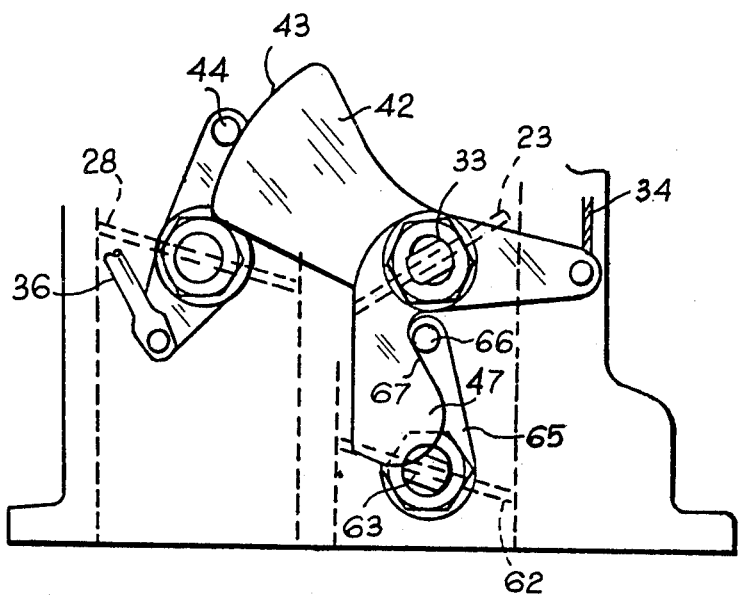
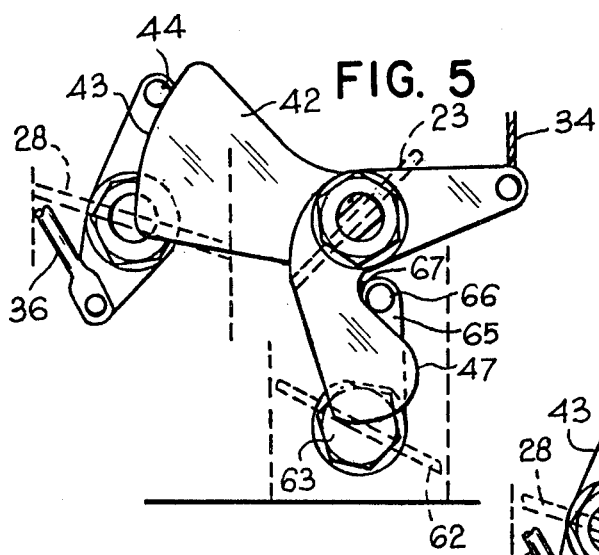
FIG. 5
FIG. 6
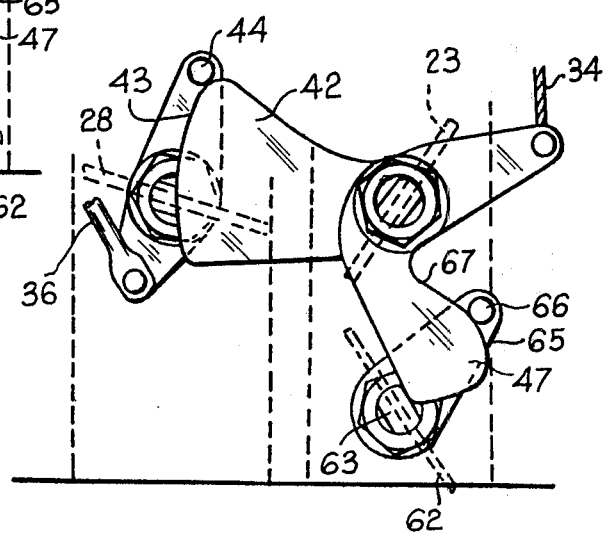

METHOD OF CONTROLLING INTERNAL COMBUSTION

BACKGROUND OF THE INVENTION

This invention relates to an induction system for an internal combustion engine and more particularly to an improved throttle arrangement for such an engine.

Recently it has been found that the combustion efficiency of an internal combustion engine may be significantly improved by supplying the idle and low speed mixture requirements of the engine to the cylinders through a sub or auxiliary intake system that has substantially less cross-sectional area than the main induction system. As the load on the engine increases, an increasing proportion of the mixture is supplied to the chambers through the main induction system in accordance with this invention. By introducing the low speed mixture to the engine through a small induction passage, turbulence and, if desired, swirl is generated in the chamber at the time of ignition. This causes more rapid flame propagation and an improvement in both fuel economy and a reduction in the emission of unwanted exhaust gas constituents. In connection with such an arrangement, a pair of throttle valves are incorporated that control both the total mixture flow and the amount of flow through the main induction passage.

In order to fully enjoy the benefits of this type of system it has been found desireable to accurately control the sequence of operation of these throttle valves.

It is, therefore, a principal object of this invention to provide an improved induction system for an internal combustion engine.

It is another object of the invention to provide an engine induction system embodying a main and auxiliary induction system having accurate flow control through the respective induction systems.

It is a still further object of this invention to provide an improved throttle control system for the induction system of an internal combustion engine.

SUMMARY OF THE INVENTION

This invention is adapted to be embodied in an induction system for an internal combustion engine that has at least one variable volume chamber in which combustion occurs, a main induction passage for delivering a charge to the chamber and an auxiliary induction passage for delivering a charge to the chamber. The auxiliary induction passage has a substantially lesser cross-sectional area than the main induction passage whereby a given mass flow rate through the auxiliary induction passage will enter the chamber at a substantially greater velocity than the same mass flow rate through the main induction passage. Throttle valve means control the proportion of the flow to the chamber through the induction passages. The throttle means comprises a primary throttle valve for controlling the total mass flow to the chamber and a secondary throttle valve for controlling the flow through the main induction passage.

In accordance with a first feature of the invention, linkage means is provided for controlling the movement of the secondary throttle valve upon movement of the primary throttle valve for delaying the opening of the secondary throttle valve until the primary throttle valve is opened a predetermined degree.

In accordance with another feature of the invention, linkage means controls the movement of the secondary throttle valve upon movement of the primary throttle valve so that the secondary throttle valve is opened at a rate that is not linearly related to the rate of opening of the primary throttle valve.

In accordance with a third feature of the invention, linkage means control the movement of the secondary throttle valve upon movement of the primary throttle valve in such a way that the secondary throttle valve reaches its fully opened position prior to full opening of the primary throttle valve.

BRIEF DESCRIPTION OF THE DRAWINGS

FIG. 4 is a side elevational view, in part similar to FIG. 3, showing the throttle linkage of the carburetor in an off idle condition.

FIG. 5 is a side elevational view, in part similar to FIGS. 3 and 4, showing the throttle linkage in a more fully opened position.

FIG. 6 is a side elevational view, in part similar to FIGS. 3, 4 and 5, showing the throttle linkage in a nearly full throttle position.

DETAILED DESCRIPTION OF THE PREFERRED EMBODIMENTS

Figure 1:
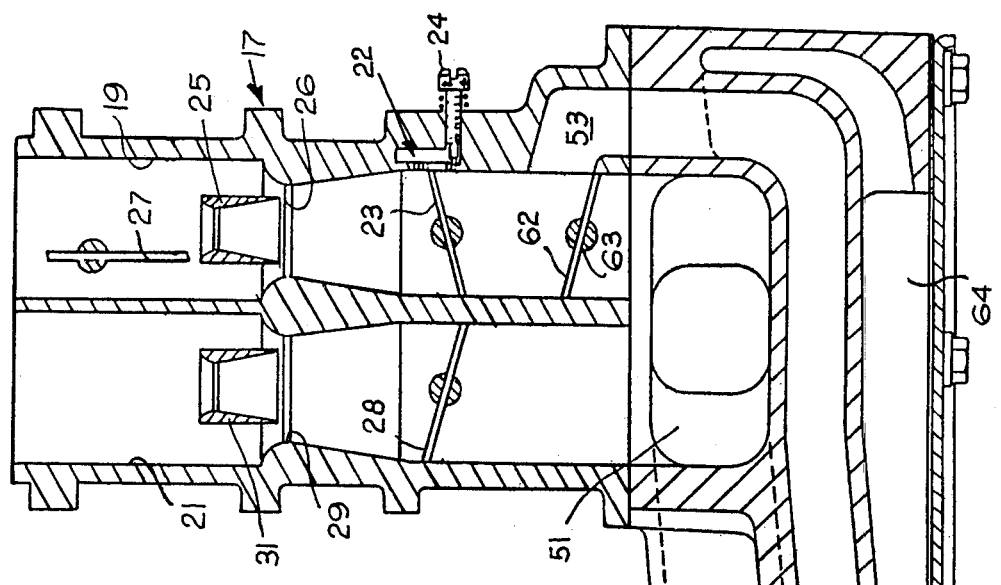
FIG. 1 is a transverse cross-sectional view through a single cylinder of a multiple cylinder internal combustion engine embodying this invention.

Referring first to FIG. 1, an internal combustion engine embodying this invention is identified generally by the reference numeral 11. The engine 11 includes a cylinder block 12 having a plurality of cylinder bores 13, only one of which is shown in the drawings, in which a piston 14 is supported for reciprocation in a known manner. A cylinder head 15 is affixed to the cylinder block 12 and defines with the cylinder bores 13 and pistons 14 a plurality of variable volume combustion chambers 16.

A carburetor, indicated generally by the reference numeral 17 is provided for delivering a charge to the combustion chambers 16 through an intake manifold, indicated generally by the reference numeral 18.

The carburetor 17 is of the two barrel staged type and includes a primary barrel 19 and a secondary barrel 21. An idle fuel discharge circuit 22 is positioned contiguous to the primary throttle valve 23 of the primary barrel 19. An adjusting needle 24 is provided for the idle circuit 22, in a known manner. A main fuel discharge system including a boost discharge nozzle 25 is positioned in the barrel 19 adjacent the venturi section 26, as is also well known. A choke valve 27 is rotatably supported in the air horn portion of the barrel 19 for providing cold starting enrichment.

Figure 3:
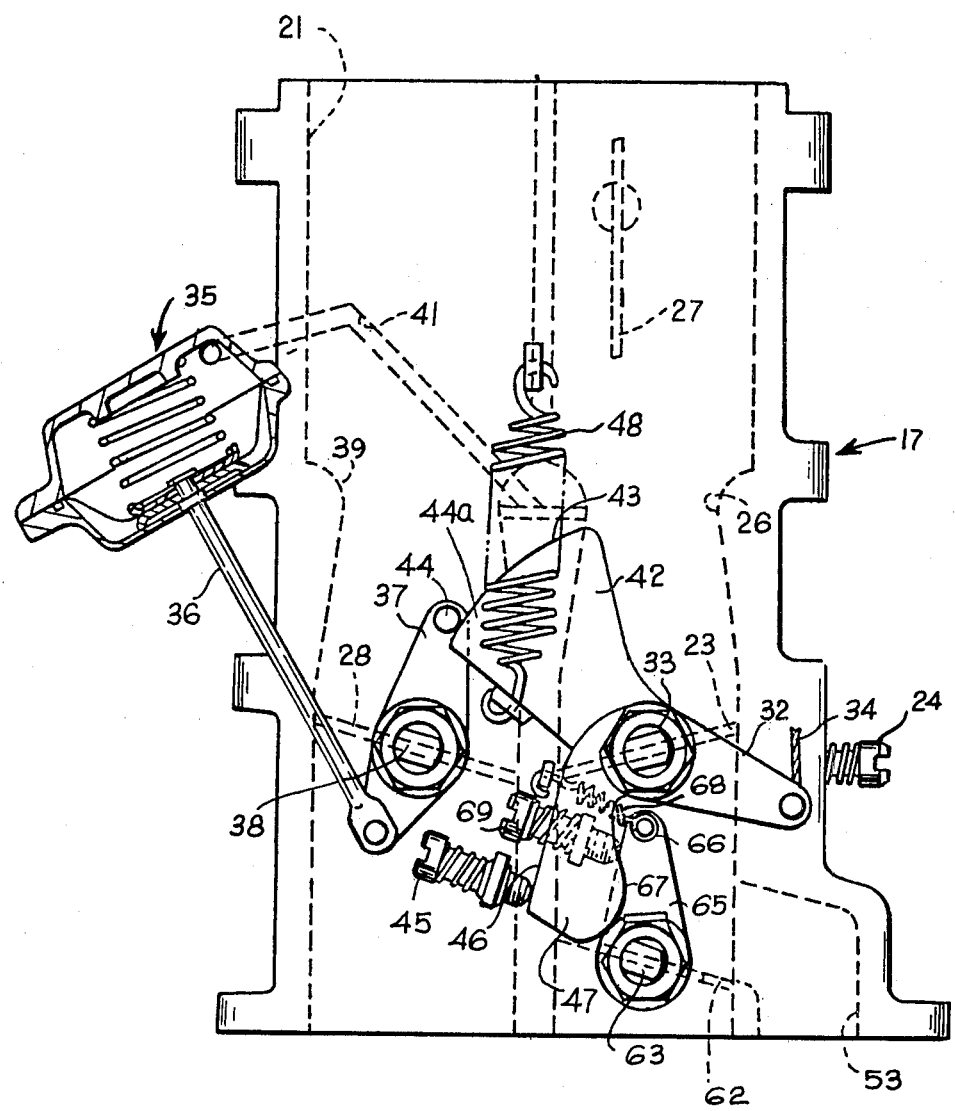
FIG. 3 is an enlarged side elevational view, with a portion broken away, of the carburetor shown in FIG. 1.

A main throttle valve 28 is positioned in the secondary barrel 21 downstream of the venturi section 29. Fuel is discharged into the secondary barrel 21 by means of a boost nozzle 31 and associated fuel discharge circuit (not shown) of a known type. Considering now FIG. 3, a bellcrank 32 is affixed to the shaft 33 of the primary barrel main throttle valve 23 and is controlled by means of a flexible cable 34 that is connected in any known manner to the accelerator pedal of the associated vehicle. The secondary barrel main throttle valve 28 is positioned by means of a diaphragm motor 35 that is connected by means of a link 36 to a lever 37 that is affixed to the throttle valve shaft 38 of the secondary barrel main throttle valve 28. The diaphragm motor positions the throttle valve 28 in accordance with the pressure in the primary venturi section 26 and the secondary venturi 39 by means of an interconnecting conduit 41, as is well known in the art. A cam 42 is affixed for rotation with the primary barrel main throttle valve shaft 33 and has a cam face 43 that is adapted to be contacted by a pin 44 on the secondary barrel main throttle valve shaft 38 for precluding opening of the secondary main throttle valve 28 until the primary main throttle valve 23 is opened above its low and medium range position.

The idle position of the primary barrel main throttle valve 23 is controlled by means of an adjustable stop 45 that contacts a shoulder 46 formed on the bellcrank arm 47. A tension spring 48 normally urges the shoulder 48 against the adjustable stop 45. The construction thus far described is substantially the same as with conventional two barrel staged carburetors and, for that reason, further discussion of the fuel discharge circuits and of the carburetor 17 is believed to be unnecessary.

In accordance with this invention, the idle and low speed charge requirements of the engine 11 are supplied through an auxiliary or sub-induction passage which has substantially less cross-sectional area than the main induction passage. This has the advantage of increasing the velocity of the charge entering the chambers 16 under these running conditions and establishing a swirl, if desired. This increased turbulence has been found to significantly improve engine operation, particularly economy and emission of unwanted exhaust gas constituents by speeding flame propagation and stabilizing combustion.

The manifolding which provides the main induction passages and auxiliary induction passages and which delivers the charge through these respective passages through the chambers 16 will now be described in detail by particular reference to FIG. 1.

The intake manifold 18 has a main plenum chamber 51 that receives a charge from the carburetor primary and secondary barrels 19, 21. The plenum 18 discharges through a plurality of runner passages 52 that meet with cylinder head intake passages 53 that feed the respective chambers 16. An intake valve 54 controls the communication between the cylinder head main intake passages 53 and the chambers 16 in a known manner.

The lower portion of the carburetor assembly 17 in the primary barrel 19 below the main throttle valve 23 is formed with a sub-intake inlet passage 53. The passage 53 communicates through the intake manifold 18 with a plurality of manifold sub-intake passages 54. The manifold sub-intake passages 54 each communicates with a cylinder head sub-intake passage 55 that terminates in a sub-intake port 56. A sub-intake valve 57, which may be operated by a cam shaft or in any other manner controls the flow through the sub-intake port 56. The sub-intake port 56 is formed by a tubular member 58 that is threaded into the cylinder head as clearly shown in FIG. 1.

Figure 2:
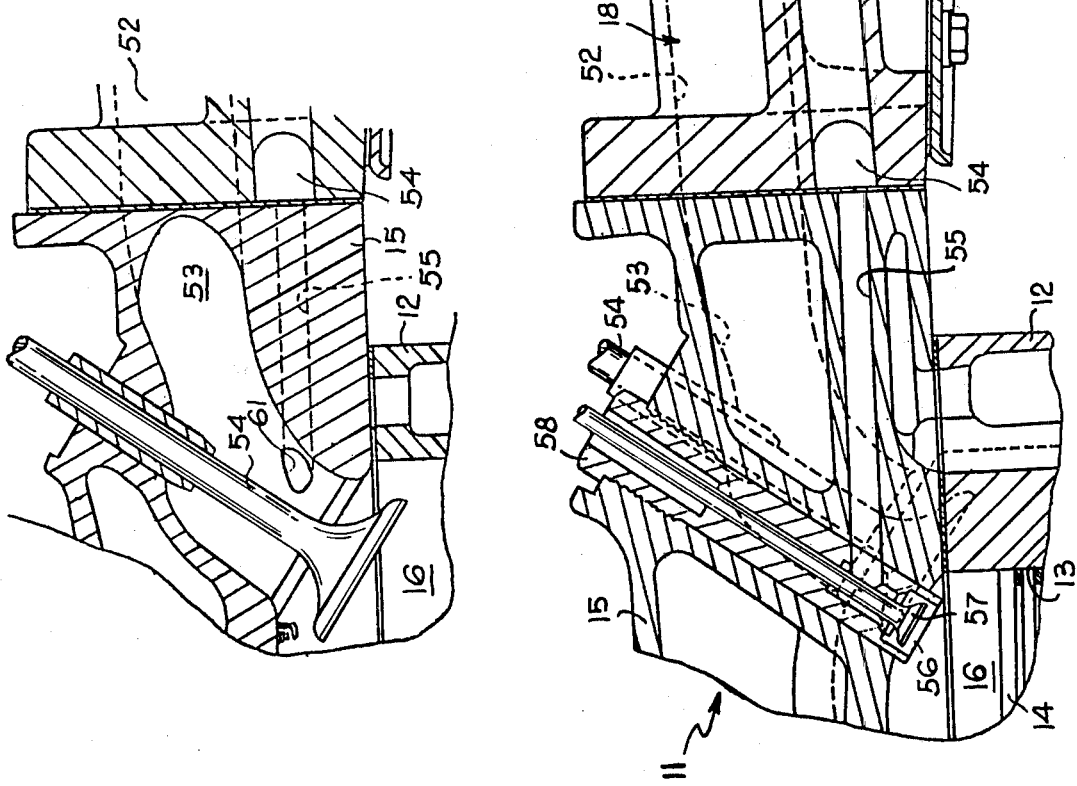
FIG. 2 is a partial cross-sectional view, in part similar to FIG. 1, showing another embodiment of the invention.

In the embodiment of FIG. 1, as has been noted, the flow through the sub-intake passage is controlled by a separate valve 57. The arrangement may be simplified and the sub-intake valve eliminated through a construction as shown in FIG. 2. In FIG. 2 only a portion of the structure is illustrated and only that portion which differs from the already described embodiment will be described in detail. In this embodiment, the cylinder head sub-intake passage 55 terminates within the main intake passage 53 at a sub-intake port 61. The discharge from the port 61 will enter the chamber 16 when the main intake valve 16 is opened.

With either the embodiment of FIG. 1 or FIG. 2, the sub-intake passage enters the chamber at a high velocity and, therefore, will increase turbulence at the time of ignition and will improve engine performance, as heretofor noted. If desired, the sub-intake ports 56 or 61 and the associated sub-intake passages 55 may be disposed so as to impart a swirling motion to the intake charge.

Referring again to FIG. 1, the manner for controlling the proportion of flow to the chambers 16 through the main and auxiliary or sub-intake passages will now be described. It is to be understood that the same arrangement for providing the flow control is used in either the embodiments of FIGS. 1 or 2. Positioned in the carburetor barrel 19 downstream from the sub-intake passage inlet 53 is an auxiliary or sub-throttle valve 62. The sub-throttle valve 62 is supported in the barrel 19 upon a sub-throttle valve shaft 63. It should be apparent that when the sub-throttle valve 62 is closed that the mixture delivered by the carburetor barrel 19 will all be shunted into the sub-intake passage inlet 53 for delivery into the chambers 16 through the sub-intake passages 54 and 55. As the sub or auxiliary throttle valve 62 is progressively opened, progressively more flow will enter the chambers 16 through the main intake passages 52 and 53. The system may be viewed as the primary barrel main throttle valve 23 controlling the total mass flow through the induction system to the chambers 16 with the sub or auxiliary throttle valve 62 controlling the total mass flow through the main intake passages. As such, the sub-throttle valve 62 also determines the proportion of flow entering the chambers between the auxiliary and main induction passages.

The manifold 18 is provided with a jacket 64 through which engine coolant is circulated to heat the mixture, particularly the mixture flowing through the sub-intake passages 54 which is more closely juxtaposed to the chamber 64.

The linkage for controlling the relative movements of the primary barrel main throttle valve 23 and auxiliary throttle valve 62 will now be described by particular reference to FIGS. 3-6. A lever 65 is affixed to the sub-throttle valve shaft 63 and carries a pin or roller 66 at its outer end which is juxtaposed to a cam surface 67 of the arm 47 of the bellcrank that is fixed to the main throttle valve shaft 33.

A tension spring 68 is affixed to the lever 65 and biases this lever into engagement with an adjustable stop 69 that determines the closed or idling position of the sub-throttle valve 62.

The configuration of the cam 67 and the radius of travel of the roller 66 control the rate of opening of the sub-throttle valve 62 relative to the opening of the primary throttle valve 23. The flow characteristics in accordance with a preferred embodiment of the invention through the main and sub-intake passages are represented by the graphical illustration of FIG. 7. In this Figure, the opening of the primary barrel main throttle valve 23 is indicated on the ordinant and the volume of air flow is indicated on the abscissa. Also illustrated in this graphical analysis are the effective flow areas past the respective valves in their relative positions.

The solid line curve indicates the effective air flow area of the main throttle valve 23 as it moves through its full range. This curve is not completely linear due to the fact that the valve opening as expressed on the ordinant is expressed in degrees.

The broken line view illustrates the effective flow area of the sub-throttle valve 62 for a given position of the main throttle valve 23. It will be noted that the sub-throttle valve begins to open at a later point than does the main throttle valve and also reaches its fully opened position prior to the full opening of the main throttle valve 23. This arrangement will be described in more detail in connection with the description of the operation of the linkage as this description proceeds.

The dot dash line shows the total amount of air flowing through the system and the dot dot dash line shows the amount of air that would flow through the sub-intake system when the sub-throttle valve 62 was maintained in its fully closed position.

Figure 7:
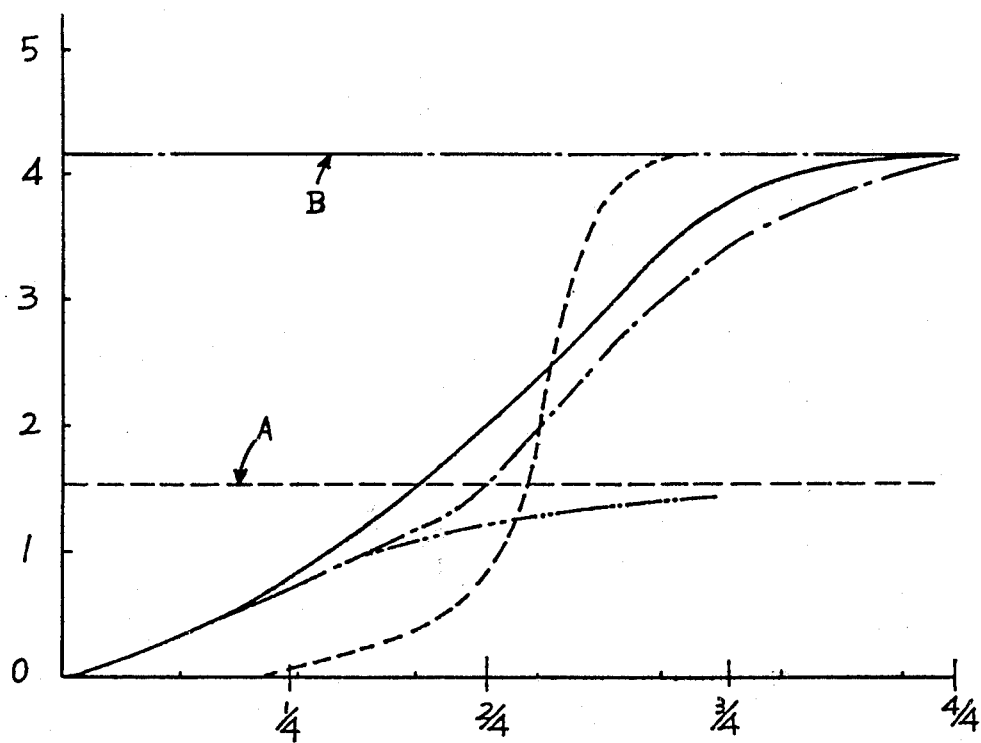
FIG. 7 is a graph showing the mixture flow through the induction system of the illustrated embodiment.

Referring now again to FIGS. 3-6 in conjunction with the graphical illustration of FIG. 7, FIG. 3 shows the position of the various throttle valves during the idle condition. The sub-throttle valve 62 is substantially fully closed and the primary throttle valve 23 is at its idle position as set by the adjustable stop 45. All of the mixture requirements for the engine will, therefore, be supplied through the sub-intake system. As has been previously noted, this will cause the charge to be delivered to the chambers 16 at a relatively high velocity so as to increase turbulence in the combustion chamber at the time of ignition.

It will be noted that a clearance exists between the rollers 66 and the cam surface 67 when the throttle valves are in their idle position. As a result, at least some initial opening of the main throttle valve 23 is permitted before the auxiliary throttle valve 62 begins to open. In a preferred embodiment of the invention, the auxiliary throttle valve 62 is not opened until the air flow area past the main throttle valve 23 reaches approximately one-third of the total sub-intake port effective cross-sectional area. It will be noted from FIG. 7 that this point occurs when the flow through the sub-intake system is no longer linear but experiences a drop off in flow for a given valve opening as a result of the restriction generated by the relatively small cross-sectional are of the sub-intake passages. At this point, as seen in FIG. 4, the cam surface 67 engages the roller 66 and continued opening of the main throttle valve 23 will begin to effect opening of the sub-throttle valve 62.

It has been found that engine performance is improved if the sub-throttle valve 62 is opened to provide approximately one-third of its total flow area at the time when the main throttle valve 23 is opened to a point that its effective flow area equals the effective flow area of the sub-intake system. This is achieved through the geometry of the linkage and the slope of the cam surface 67 as has been previously noted. It has been found that when this condition occurs, the amount of flow through the main intake passages is rapidly increased while the effect of the flow through the sub-intake system is in effect decreased. It has been found that this flow control ratio minimizes the effect of variations in manufacturing tolerances and the effect of variations in the introduction of exhaust gases or crank case gases in the combustion process. It has also been found that this condition minimizes the effect of ignition timing variations.

This condition is also chosen so that it occurs at approximately the normal highway cruising speed of the associated vehicle.

As may be seen from a comparison of FIG. 5 and 6, as the main throttle valve 23 is more fully opened, the shape of the cam surface 67 and its coaction with the roller 66 causes the auxiliary or sub-throttle valve 62 to be rotated at an increasing rate so that the sub-throttle valve 62 reaches its fully opened position prior to full opening of the main throttle valve 23. When the auxiliary throttle valve 62 is fully opened, the flow through the sub-induction system comprised of the passages 53, 54 and 55 will be relatively negligible in quantity and the engine 11 operates generally in a conventional manner.

It is to be understood that the foregoing description is that of preferred embodiments of the invention and that various changes and modifications may be made without departing from the spirit and scope of the invention as defined by the appended claims.

We claim:

1. An induction system for an internal combustion engine having at least one variable volume chamber in which combustion occurs comprising a main induction passage for delivering a charge to said chamber, said main induction passage having a flow control portion, an auxiliary induction passage for delivering a charge to said chamber, said auxiliary induction passage having a substantially lesser cross-sectional area than said main induction passage whereby a given mass flow rate through said auxiliary induction passage will enter said chamber at a substantially greater velocity than the same mass flow rate through said main induction passage, said auxiliary induction passage having its outlet disposed in close proximity to said chamber so that the charge delivered to said chamber through said auxiliary induction passage enters said chamber at substantially undiminished velocity, and throttle valve means for controlling the proportion of flow to said chamber through said induction passages, said throttle valve means comprising a primary throttle valve in said main induction passage flow control portion for controlling the flow therethrough and a secondary throttle valve for effecting control of the flow through said auxiliary induction passage, the improvement comprising linkage means for controlling the movement of one of said throttle valves upon movement of the other of said throttle valves, said linkage means being effective to provide for opening of the other throttle valve to the point at which the flow through the auxiliary induction passage is no longer increased in proportion to the amount of movement of the other valve and then initiating opening of the one throttle valve.

2. An internal combustion engine as set forth in claim 1 wherein the one throttle valve is not opened until the effective opening provided by the other throttle valve reaches approximately one-third of the total effective cross-sectional area of the auxiliary induction passage.

3. An internal combustion engine as set forth in claim 1 wherein the linkage means is effective to cause the one throttle valve to open at a rate that is not linearly related to the opening of the other throttle valve.

4. An internal combustion engine as set forth in claim 1 wherein the linkage means is effective to cause the one throttle valve to become fully opened prior to the point at which the other throttle valve is fully opened.

5. An internal combustion engine as set forth in claim 4 wherein the linkage means is effective to cause the one throttle valve to open at a rate that is not linearly related to the opening of the other throttle valve.

6. An internal combustion engine as set forth in claim 5 wherein the one throttle valve is not opened until the effective opening provided by the other throttle valve reaches approximately one-third of the total effective cross-sectional area of the auxiliary induction passage.

7. An internal combustion engine as set forth in claim 1 wherein the linkage means comprises a cam carried by the other throttle valve and rotatable therewith and a follower operably connected to the one throttle valve and cooperable with said cam for rotating said one throttle valve.

8. An internal combustion engine as set forth in claim 7 wherein there is a clearance between the cam and follower when the throttle valves are both in their idle position for effecting the delay in opening of the one throttle valve.

9. An internal combustion engine as set forth in claim 8 wherein the cam and follower provide a non-linear rate of opening of the one throttle valve relative to the other throttle valve.

10. An internal combustion engine as set forth in claim 9 wherein the cam and follower are configured to effect full opening of the one throttle valve before the other throttle valve reaches its fully opened position.

11. An induction system for an internal combustion engine having at least one variable volume chamber in which combustion occurs comprising a main induction passage for delivering a charge to said chamber, an auxiliary induction passage for delivering a charge to said chamber, said auxiliary induction passage having a substantially lesser effective cross-sectional area than said main induction passage whereby a given mass flow rate through said auxiliary induction passage will enter said chamber at a substantially greater velocity than the same mass flow rate through said main induction passage; said auxiliary induction passage having its inlet in communication with said main induction passage and its outlet disposed in close proximity to said chamber so that the charge delivered to said chamber through said auxiliary induction passage enters said chamber at undiminished velocity, and throttle valve means for controlling the proportion of flow to said chamber through said induction passages, said throttle valve means comprising a primary throttle valve in said main induction passage upstream of said auxiliary induction passage inlet for controlling the flow and a secondary throttle valve in said main induction passage downstream of said primary throttle valve and said auxiliary induction passage inlet for effecting control of the flow through said auxiliary induction passage, the improvement comprising linkage means for controlling the movement of said secondary throttle valve upon movement of said primary throttle, said linkage means comprising a cam carried by the primary throttle valve and rotatable therewith and a follower operably connected to said secondary throttle valve and cooperable with said cam for rotating said secondary throttle valve, said linkage means being effective to cause said secondary throttle valve to open at a rate that is not linearly related to the rate of opening of said primary throttle valve and to effect full opening of said secondary throttle valve before said primary throttle valve reaches its fully opened position.

12. An induction system for an internal combustion engine having at least one variable volume chamber in which combustion occurs comprising a main induction passage for delivering a charge to said chamber, an auxiliary induction passage for delivering a charge to said chamber, said auxiliary induction passage having a substantially lesser cross-sectional area than said main induction passage whereby a given mass flow rate through said auxiliary induction passage will enter said chamber at a substantially greater velocity than the same mass flow rate through said main induction passage, said auxiliary induction passage having its inlet in communication with said main induction passage and its outlet disposed in close proximity to said chamber so that the charge delivered to said chamber through said auxiliary induction passage enters said chamber at substantially undiminished velocity, and throttle valve means for controlling the proportion of flow to said chamber through said induction passages, said throttle valve means comprising a primary throttle valve in said main induction passage upstream of said auxiliary induction passage inlet for controlling the flow and a secondary throttle valve in said main induction passage downstream of said primary throttle valve and said auxiliary induction passage inlet for effecting the control of the flow through said auxiliary induction passage, the improvement comprising linkage means for controlling the movement of said secondary throttle valve upon movement of said primary throttle valve, said linkage means being effective to cause said secondary throttle valve to reach its fully opened position prior to full opening of said primary throttle valve.

13. An internal combustion engine as set forth in claim 12 wherein the linkage means comprises a cam carried by the primary throttle valve and rotatable therewith and a follower operably connected to the secondary throttle valve and cooperable with said cam for rotating said secondary throttle valve.

14. An induction system as set forth in claim 11 or 12 wherein the linkage means is operative to provide for opening of said primary throttle valve to a predetermined position prior to initiation of movement of said secondary throttle valve.

* * * * *